United States Patent

Fovall

[11] Patent Number: 5,730,396
[45] Date of Patent: Mar. 24, 1998

[54] CORD GUIDE FOR APPLIANCE CADDY

[76] Inventor: Nettie L. Fovall, 1444 McKinley Ave., Pomona, Calif. 91768

[21] Appl. No.: 653,773

[22] Filed: May 28, 1996

[51] Int. Cl.[6] .................................. F16L 3/00; D06F 79/02
[52] U.S. Cl. .................... 248/51; 248/117.7; 248/117.1; 248/227.2
[58] Field of Search ........................ 248/51, 52, 117.1, 248/117.5, 117.7, 308, 81, 82, 80, 227.2

[56] References Cited

U.S. PATENT DOCUMENTS

| | | | |
|---|---|---|---|
| 1,045,123 | 11/1912 | Elisby | 248/117.7 |
| 1,597,563 | 8/1926 | Arndt | 248/117.7 |
| 1,974,811 | 9/1934 | Gattinger | 248/51 |
| 2,716,531 | 8/1955 | Johnson | 248/51 |
| 3,770,234 | 11/1973 | Fovall | 248/117.7 |
| 3,866,869 | 2/1975 | Woods | 248/51 |

Primary Examiner—Ramon O. Ramirez
Assistant Examiner—Anita M. King
Attorney, Agent, or Firm—Robert M. Sperry

[57] ABSTRACT

An improved appliance caddy having a pulley for releasably retaining the electric cord in a desired position, when the appliance is in the stored position, yet allowing free movement of the electric cord when the appliance is moved.

4 Claims, 3 Drawing Sheets

CORD GUIDE FOR APPLIANCE CADDY

FIELD OF INVENTION

This invention relates to caddies for holding electrical appliances when not in use and is particularly directed to an improved caddy having means for retaining the electrical cord of an appliance held by the caddy while allowing free movement of the cord when the appliance is in use.

PRIOR ART

It has long been known that ironing clothes serves to remove wrinkles and to generally improve the appearance of clothing, table linens and the like. However, the ironing operation requires the use of a very hot iron, which must be stood in an upright position, on its hind end, during intervals of non-use to prevent burning the cover of the ironing surface or articles to be ironed, which may be lying on the ironing surface. Also, manufacturers often recommend that irons should not be laid flat, especially when hot, since this could ruin the heating element. Unfortunately, when stood upright, on its hind end, the iron tends to be quite unstable and any accidental bumping of the iron or jarring of the ironing surface is likely to displace the iron. When such displacement occurs, the iron may topple into contact with the operator's hand, arm, leg or the like, causing possible severe burns, bruises or other injuries or may cause scorching of the cover of the ironing surface or an article to be ironed which is lying on the ironing surface. This can be extremely dangerous for persons performing the ironing operation and presents a serious fire hazard, if not detected promptly. Furthermore, when an iron is knocked off of an ironing board, the point can cause a hole in any floor covering and the iron is often smashed to pieces. There are numerous prior art devices which have been proposed for overcoming these problems. However, many of the prior art devices are complex to install and use and are expensive to purchase. Other prior art devices serve to releasably retain the iron, but allow the cord of an electric iron to hang free and, hence, to possibly become entangled with and snagged on articles to be ironed and to cause displacement and toppling of the iron when such articles are moved, which can be dangerous, as noted above. My prior patent, U.S. Pat. No. 3,770,234, issued Nov. 6, 1973, shows an ironing caddy which releasably retains an iron during intervals of non-use. However, my prior device simply has a hook for releasably retaining the ironing cord. Unfortunately, it has been found that such hooks tend to snag or bind on the ironing cord, making it difficult to move the iron in a desired manner and, thus, interfering with the ironing operation. Thus, none of the prior art ironing caddys have been entirely satisfactory.

BRIEF SUMMARY AND OBJECTS OF INVENTION

These disadvantages of the prior art are overcome with the present invention and an improved ironing caddy is provided which is simple and inexpensive to produce and purchase, and which safely and securely retains an iron in its upright position, yet which allows the iron to be removed quickly and easily without danger of snagging or binding the ironing cord.

These advantages of the present invention are preferably attained by providing an improved appliance caddy having a pulley for releasably retaining the electric cord in a desired position, when the appliance is in the stored position, yet allowing free movement of the electric cord when the appliance is moved.

Accordingly, it is an object of the present invention to provide an improved appliance caddy.

Another object of the present invention is to provide an improved appliance caddy which is simple and inexpensive to produce and purchase.

An additional object of the present invention is to provide an improved appliance caddy which safely and securely retains an appliance in its stored position.

A further object of the present invention is to provide an improved appliance caddy which allows the appliance to be removed quickly and easily without danger of snagging or binding the electric cord.

A specific object of the present invention is to provide an improved appliance caddy having a pulley for releasably retaining the electric cord in a desired position, when the appliance is in the stored position, yet allowing free movement of the electric cord when the appliance is moved.

These and other objects and features of the present invention will be apparent from the following detailed description, taken with reference to the figures of the accompanying drawing.

DETAILED DESCRIPTION OF THE INVENTION

Figure 1:
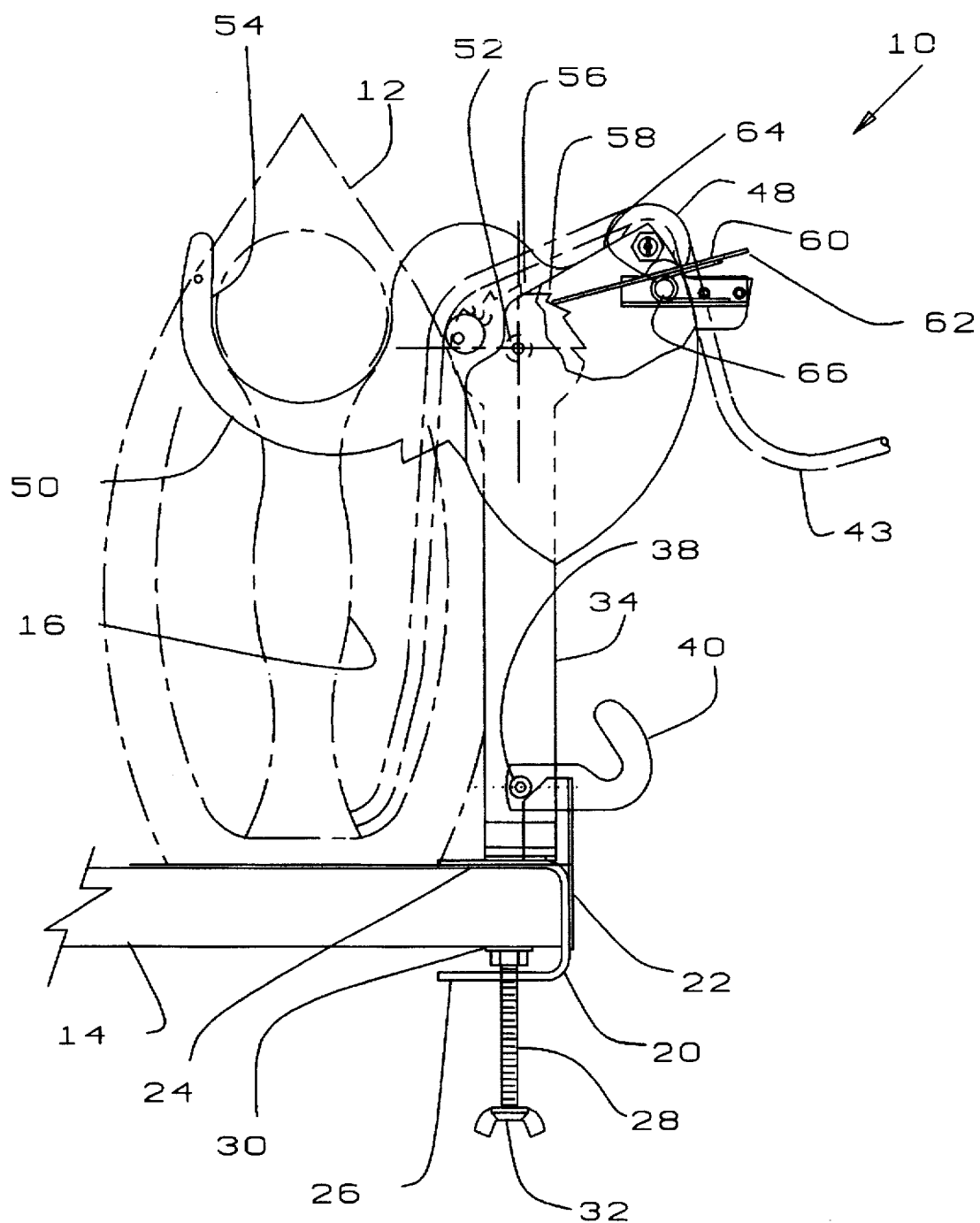
FIG. 1 is a front view of an appliance caddy embodying the present invention.

In that form of the present invention chosen for purposes of illustration in the drawing, FIG. 1 shows an appliance caddy, indicated generally at 10, supporting an electric iron 12 on an ironing board 14. The caddy 10 is releasably attached to the ironing board 14 by suitable means, such as clamping means 20 and has a hook 50 which may be extended through the handle 16 of the iron 12 to releasably retain the iron 12 in its stored position, as seen in broken lines in FIG. 1, to prevent the iron 12 from tipping or falling.

The clamping means 20 comprises a generally U-shaped member 22 adapted to embrace the edge of the ironing board 14 between the upper arm 24 and lower arm 26 of the U-shaped member 22. The upper arm 24 rests on the upper surface of the ironing board 14, while the lower arm 26 extends below the ironing board 14 and has a screw 28 threaded through the lower arm 26 and terminating in a pad 30, which is engageable with the underside of the ironing board 14. The opposite end of the screw 28 carries a wing actuator 32 to facilitate tightening and loosening of the screw 28 and pad 30, which enables the clamping member 20 and caddy 10 to be attached or removed quickly and easily.

Figure 2:
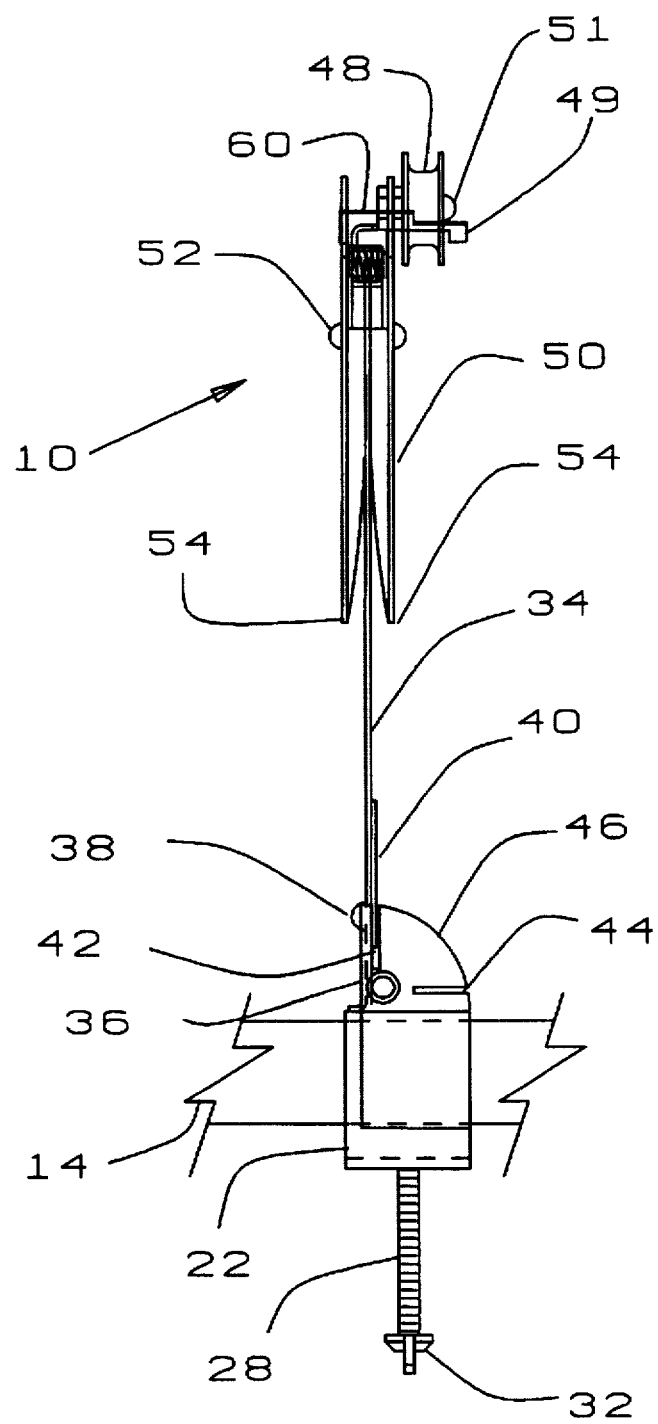
FIG. 2 is a right side view of the appliance caddy of FIG. 1.
Figure 3:
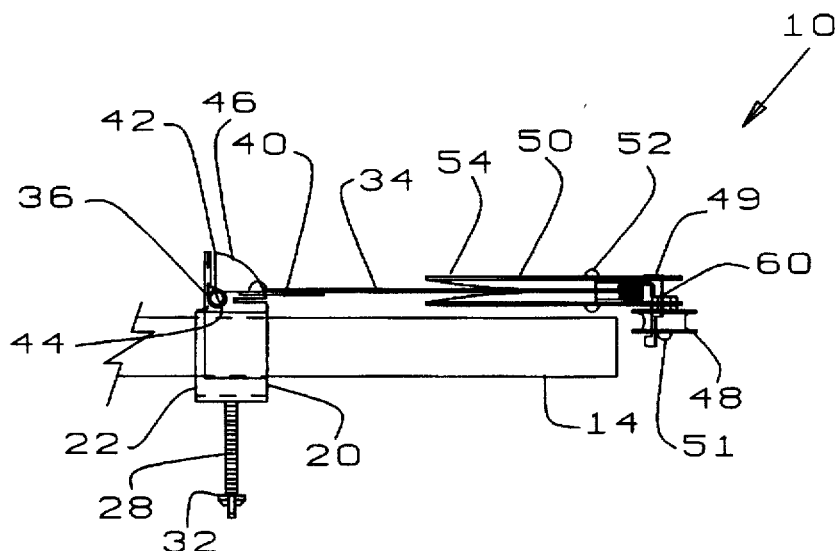
FIG. 3 is a view, similar to that of FIG. 2, showing the appliance caddy in its retracted position.
Figure 4:
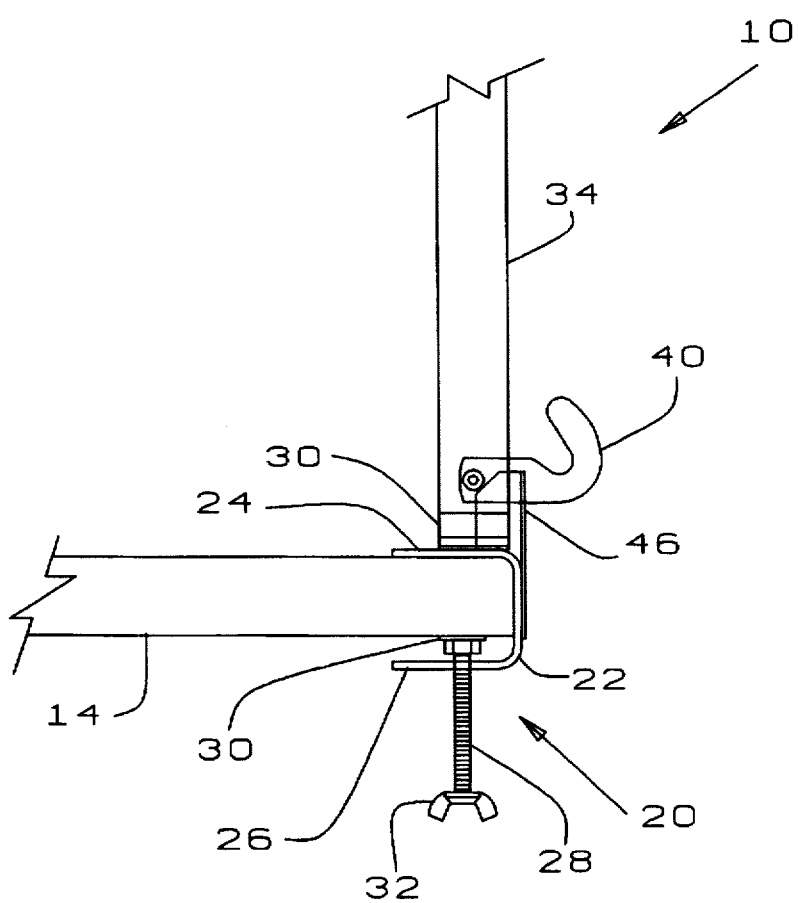
FIG. 4 is an enlarged detail showing the pulley and pawl of the appliance caddy of FIG. 1 for releasably retaining the electric cord.

The U-shaped member 22 serves as a base for a support post 34, which is pivotally connected, as seen at 36, to the upper arm 24 of the U-shaped member 22. The support post 34 is movable between a first, upright position, as seen in FIGS. 1 and 2, and a second, generally horizontal position, as seen in FIG. 3. A latching member 40 is pivotally mounted on the post 34, by pin 38 and is movable into and out of a pair of notches 42 and 44 formed in an angular projection 46 which extends upward from upper surface 24 of the U-shaped member 22. When the latching member 40 is engaged with notch 42, it serves to releasably lock the support post 34 in its upright position. However, for storage, the latching member may be disengaged from notch 42 and the support post 34 may be lowered to the position seen in FIG. 3, whereupon the latching member 40 may be engaged with notch 44 to releasably lock the support post 34 in the stored position.

In the upright position, the support post 34 carries an appliance hook 50, which is pivotally mounted, as seen at 52, adjacent the upper end of the support post 34, and which may be extended through and releasably retain the handle 16 of the iron 12, when the iron 12 is placed in its upright, storage position, as seen in broken lines in FIG. 1. As shown, the hook 50 is formed of two hook elements 54 located on respective sides of the support post 34 and having lock means 56 for releasably locking the hook 50 in a desired position. The lock means 56 comprises a ratchet 58, mounted adjacent the upper end of the support post 34, and a pawl 60 which is pivotally mounted, as seen at 64, on extension 62 of the hook 50. Spring 66 serves to maintain the pawl 60 in engagement with the ratchet 58, a pulley 48 is rotatably mounted on one of the hook elements 54 adjacent the lock means 56 and serves for retaining and guiding the electric cord 43 of the iron 12. The lock means 56 also has a projection 45 on which is mounted a flexible, generally L-shaped arm 49, which projects about the pulley 48 to prevent the electric cord 43 from becoming disengaged from the pulley 48. The pulley 48 is rotatably mounted on the lock means 54, by pin 51, and serves to releasably retain the electric cord 43, while allowing free movement of the electric cord 43 when the iron 12 is moved during use.

In use, when the iron 12 is out of use, the iron 12 is placed in its upright storage position and support post 34 is placed in its upright position, with latch member 40 engaging notch 42. Hook 50 is then positioned to engage the handle 16 of the iron 12, as seen in FIG. 1, and ratchet 58 serves to releasably lock the hook 50 in this position and, hence, serves to releasably retain the handle 16 of the iron 12 and to prevent undesired movement of the iron 12. When iron 12 is to be used, pawl 60 is released and hook 50 is moved to disengage the handle 16 of the iron 12. Next, latching member 40 is disengaged from notch 42 and the support post is moved to its lower, storage position, as seen in FIG. 3, and latching member 40 is engaged with notch 44. Thereafter, the iron 12 can be moved, as desired, and the electric cord 43 will pass freely about the pulley 48, without snagging or binding, while arm 49 serves to prevent the cord 43 from becoming disengaged from pulley 48. If it is desired to remove the cord 43, as when replacing the iron 12, the flexible arm 49 can easily be displaced to allow the cord 43 to easily be removed from the pulley 48. When the ironing is done, the user can remove the iron, by displacing the arm 49 and disengaging the cord from the pulley 48. Thereafter, latching member 40 is disengaged from notch 42 and the support post 34 is moved to its lower, storage position, as seen in FIG. 3, to enable the ironing board 14 to be folded for storage in a closet or the like, with the appliance caddy 10 still attached. This saves considerable time and effort for the user.

Obviously, numerous variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. In a caddy for an appliance having a handle and an electric cord, the combination of:

a base, a support post carried by said base, a hook pivotally connected to said support post and insertable through and engageable with said handle of said appliance, means for releasably locking said hook in a position to engage said handle, means for pivotally connecting said support post to said base for movement between a first upright position and a second lowered position, latch means for releasably locking said support post in either said first or said second position, and pulley means mounted adjacent said support post for releasably retaining the electric cord of said appliance.

2. The caddy of claim 1 wherein:

said pulley means is mounted on said hook.

3. The caddy of claim 1 further comprising:

means for releasably retaining said electric cord in engagement with said pulley means.

4. The caddy of claim 1 wherein:

said pulley means is mounted on said hook, and a flexible arm is mounted on said hook and extends about said pulley means to releasably retain said electric cord in engagement with said pulley.

* * * * *